United States Patent
Lin et al.

(10) Patent No.: US 11,592,588 B2
(45) Date of Patent: Feb. 28, 2023

(54) DATA INTERPRETATION QUALITY CONTROL USING DATA STACKING

(71) Applicant: Schlumberger Technology Corporation, Sugar Land, TX (US)

(72) Inventors: Yu Lin, Katy, TX (US); Priya Kannan, Katy, TX (US); Aaron Scollard, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 7 days.

(21) Appl. No.: 16/949,797

(22) Filed: Nov. 13, 2020

(65) Prior Publication Data

US 2021/0149069 A1 May 20, 2021

Related U.S. Application Data

(60) Provisional application No. 62/935,576, filed on Nov. 14, 2019.

(51) Int. Cl.
*G01V 1/34* (2006.01)
*G01V 1/30* (2006.01)
*G01V 1/50* (2006.01)

(52) U.S. Cl.
CPC ............ *G01V 1/345* (2013.01); *G01V 1/30* (2013.01); *G01V 1/50* (2013.01); *G01V 2210/6169* (2013.01); *G01V 2210/74* (2013.01)

(58) Field of Classification Search
CPC . G01V 1/30; G01V 1/40; G01V 11/00; G01V 1/282; G01V 99/005; G01V 1/302; G01V 1/50; G01V 1/345; G01V 2210/64; G01V 2210/66; G01V 2210/74; G01V 1/306; G01V 1/36; G01V 1/362; G01V 1/364; G01V 1/366; G01V 2200/14; G01V 2210/30; G01V 2210/614;
(Continued)

(56) References Cited

U.S. PATENT DOCUMENTS

| 6,012,017 A * | 1/2000 | Van Bemmel | ............ G01V 1/48 |
| | | | 702/14 |
| 2010/0010745 A1 * | 1/2010 | Thorne | ................. G01V 11/00 |
| | | | 702/11 |

(Continued)

OTHER PUBLICATIONS

Nusrat, S., Harbig, T., & Gehlenborg, N. (Jun. 2019). Tasks, techniques, and tools for genomic data visualization. In Computer Graphics Forum (vol. 38, No. 3, pp. 781-805). (Year: 2019).*

(Continued)

*Primary Examiner* — Yoshihisa Ishizuka
*Assistant Examiner* — Carter W Ferrell
(74) *Attorney, Agent, or Firm* — Michael Guthrie (57) ABSTRACT

Methods, apparatuses, and computer-readable media utilize data stacking to facilitate identification and/or correction of data interpretation conducted for a subsurface formation. Related data sets, such as well logs, may be displayed along with markers representing a common entity in the related data sets, such as formation features in a surface formation, and a visualization of stacked data may be generated and centered on the markers to highlight mis-alignment of any of the markers.

19 Claims, 6 Drawing Sheets

(58) Field of Classification Search
CPC ..... G01V 2210/6169; G01V 2210/643; G01V 2210/642; G01V 1/28; G06F 30/20
See application file for complete search history.

(56) References Cited

U.S. PATENT DOCUMENTS

2018/0225778 A1\* 8/2018 Grant ............... G06Q 10/06395
2019/0302291 A1\* 10/2019 Lolla ...................... G01V 1/288

OTHER PUBLICATIONS

Wang, Junpeng, et al. "Visualization and visual analysis of ensemble data: A survey." IEEE transactions on visualization and computer graphics 25.9 (2018): 2853-2872. (Year: 2018).\*

\* cited by examiner

DATA INTERPRETATION QUALITY CONTROL USING DATA STACKING

CROSS REFERENCE TO RELATED APPLICATIONS

This application claims priority to U.S. Provisional Patent Application No. 62/935,576 filed on 14 Nov. 2019, entitled, "Data Interpretation Quality Control Using Data Stacking," which is incorporated by reference herein in its entirety.

BACKGROUND

In the oil and gas industry, data is often generated from a variety of sources for clients that seek to remain privy to the latest trends in exploration and production technology. The introduction of machine learning, for example (among other technologies) has greatly facilitated interpretation of data collected from subsurface formations, e.g., well logs and the like, enabling geoscientists to produce large quantities of interpretations relatively quickly. The generation of greater volumes of interpretations, however, has created a need for new and innovative ways to provide quality control these interpretations, e.g., to facilitate identification and/or correction of misinterpretations.

SUMMARY

Methods, apparatuses, and computer-readable media are set forth for identifying and/or correcting data interpretations in part using data stacking. In some instances, related data sets, such as well logs, may be displayed along with markers representing a common entity in the related data sets, such as formation features in a surface formation, and a visualization of stacked data may be generated and centered on the markers to highlight mis-alignment of any of the markers and facilitate correction of the mis-alignment.

Therefore, consistent with one aspect of the invention, a method implemented by one or more processors may include generating a display representation of each of a plurality of related data sets associated with a subsurface formation, the display representation for each of the plurality of related data sets including a marker representing an interpretation of common entity in each of the related data sets, and generating in the display representation a visualization of stacked data from each of the plurality of related data sets, where the visualization is centered on the marker for each of the plurality of related data sets such that mis-alignment of the marker for a first related data sets among the plurality of related data sets is identifiable from the visualization.

Some embodiments may also include, after generating the visualization, updating a location of the marker of the first related data set, and updating the visualization of the stacked data based upon the updated location of the marker of the first related data set. Also, in some embodiments, updating the location of the marker is performed in response to user input. Further, in some embodiments, the user input selects a new location for the marker for the first related data set. In some embodiments, the user input selects the first related data set. In addition, some embodiments may also include generating the marker for each of the plurality of related data sets. In some embodiments, generating the marker is performed by an analytical tool. In addition, in some embodiments, generating the marker is performed in response to user input.

Moreover, in some embodiments, each of the plurality of related data sets includes a well log, where the common entity is a formation feature, where the marker for each of the plurality of related data sets is associated with a location of the formation feature in the subsurface formation, and where the visualization of stacked data is a visualization of stacked well logs. In some embodiments, the well logs for the plurality of related data sets are associated with a plurality of wells or wellbores. Moreover, in some embodiments, the well logs for the plurality of related data sets are associated with a plurality of log types.

Consistent with another aspect of the invention, a method implemented by one or more processors may include generating a display representation of each of a plurality of well logs associated with a subsurface formation, the display representation for each of the plurality of well logs including a marker representing an interpretation of a common formation feature in the subsurface formation, and generating in the display representation a visualization of stacked logs from each of the plurality of well logs, where the visualization is centered on the marker for each of the plurality of well logs such that mis-alignment of the marker for a first well log among the plurality of well logs is identifiable from the visualization.

Some embodiments may also include an apparatus including one or more processors and program code configured upon execution by the one or more processors to perform any of the methods discussed herein. Some embodiments may also include a program product including a computer readable medium and program code stored on the computer readable medium and configured upon execution by one or more processors to perform any of the methods discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 1.1-1.4 illustrate simplified, schematic views of an oilfield having subterranean formation containing reservoir therein in accordance with implementations of various technologies and techniques described herein.

DETAILED DESCRIPTION OF THE INVENTION

The embodiments discussed hereinafter in part implement data stacking to identify and/or facilitate correction of data interpretations. In particular, in some embodiments consistent with the invention, a display representation of each of a plurality of related data sets associated with a subsurface formation may be generated, and may include, for each of the plurality of related data sets, a marker representing an interpretation of common entity in each of the related data sets. In addition, a visualization of stacked data from each of the plurality of related data sets may be generated in the display representation, and may be centered on the marker for each of the plurality of related data sets such that mis-alignment of the marker for a first related data sets among the plurality of related data sets is identifiable from the visualization. As will become more apparent below, in some embodiments that related data sets may be well logs and the markers may be associated with a common formation feature in the subsurface formation, and the visualization may display stacked well logs.

Prior to a discussion of these techniques, however, an overview of oilfield operations is provided, as is an example hardware and software environment within which the herein-described concepts may be implemented.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the embodiments. However, it will be apparent to one of ordinary skill in the art that various embodiments may be practiced without these specific details. In other instances, well-known features have not been described in detail to avoid unnecessarily complicating the description.

Oilfield Operations

FIGS. 1.1-1.4 illustrate simplified, schematic views of an oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 12:
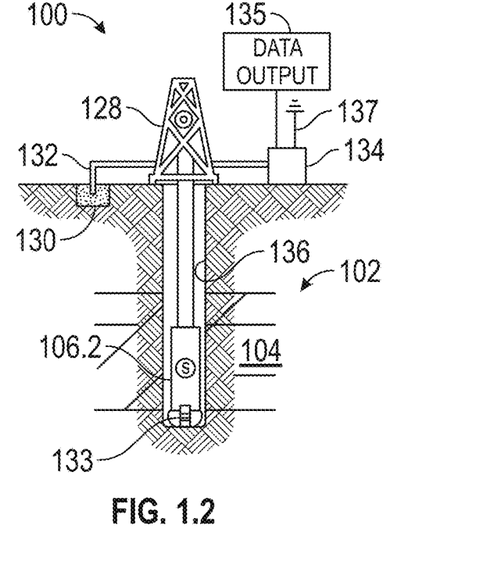

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is generally filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan generally sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 13:
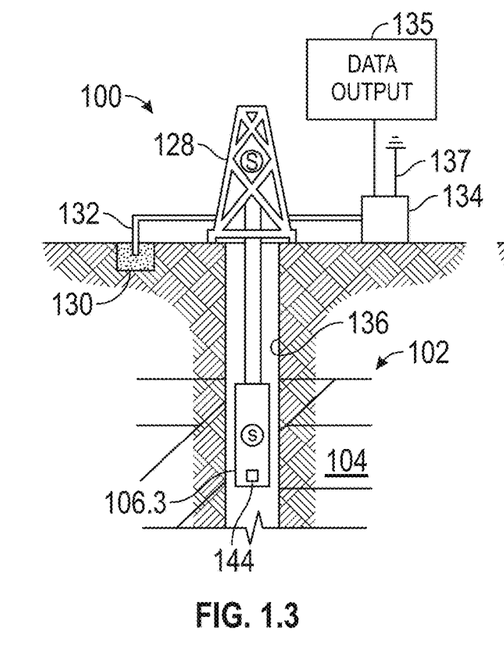

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein. In general, wireline tool 106.3 may thereby collect acoustic data and/or image data for a subsurface volume associated with a wellbore.

Figure 11:
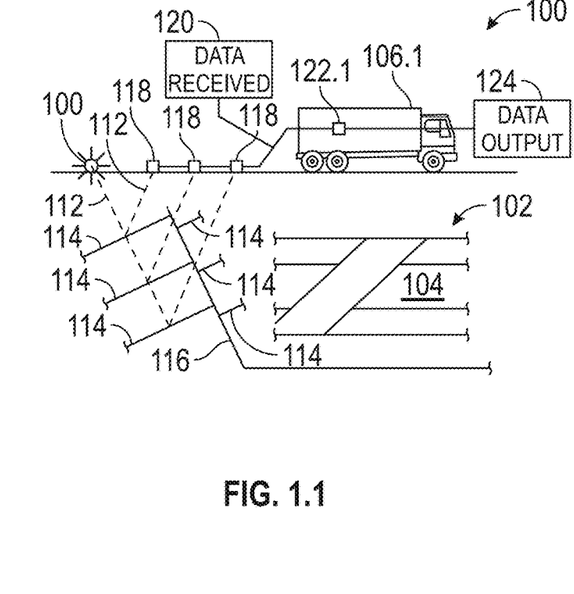

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 14:
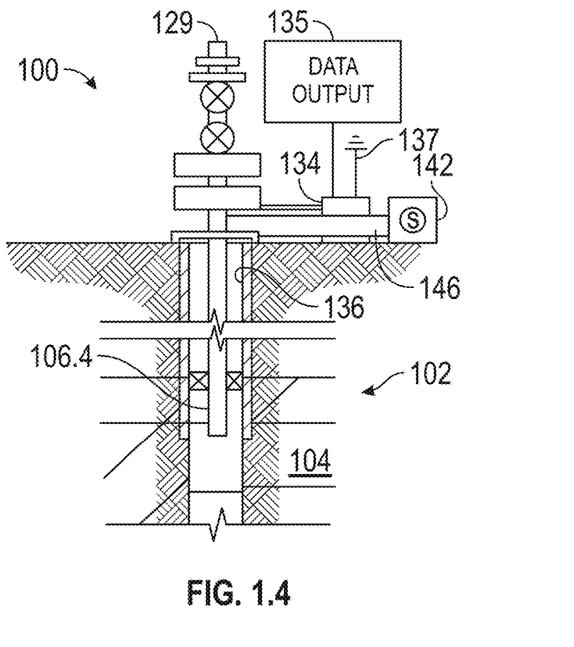

FIG. 1.4 illustrates a production operation being performed by production tool 106.4 deployed from a production unit or christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the well sites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 2:
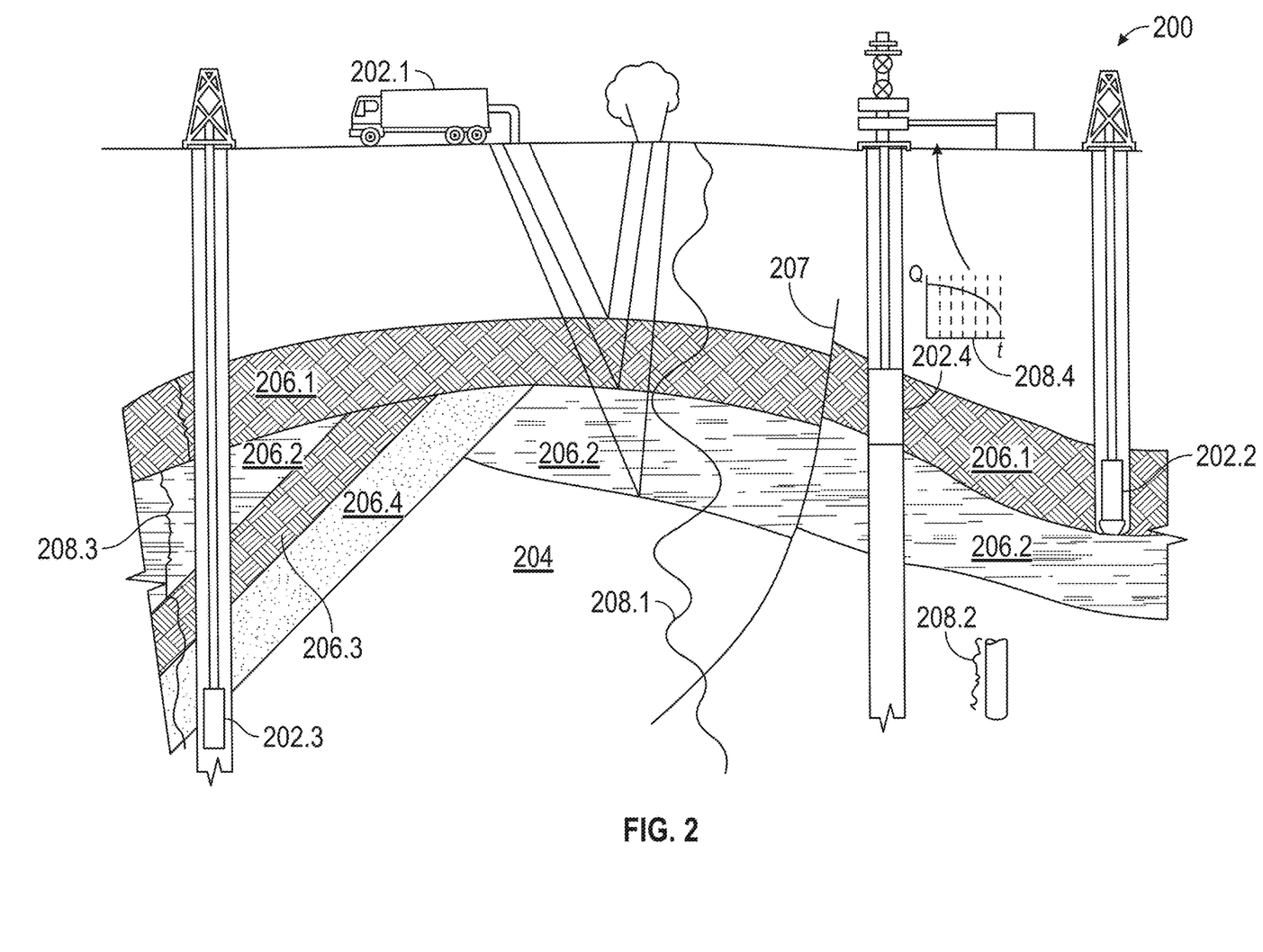
FIG. 2 illustrates a schematic view, partially in cross section of an oilfield having a plurality of data acquisition tools positioned at various locations along the oilfield for collecting data from the subterranean formations in accordance with one or more embodiments.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 3:
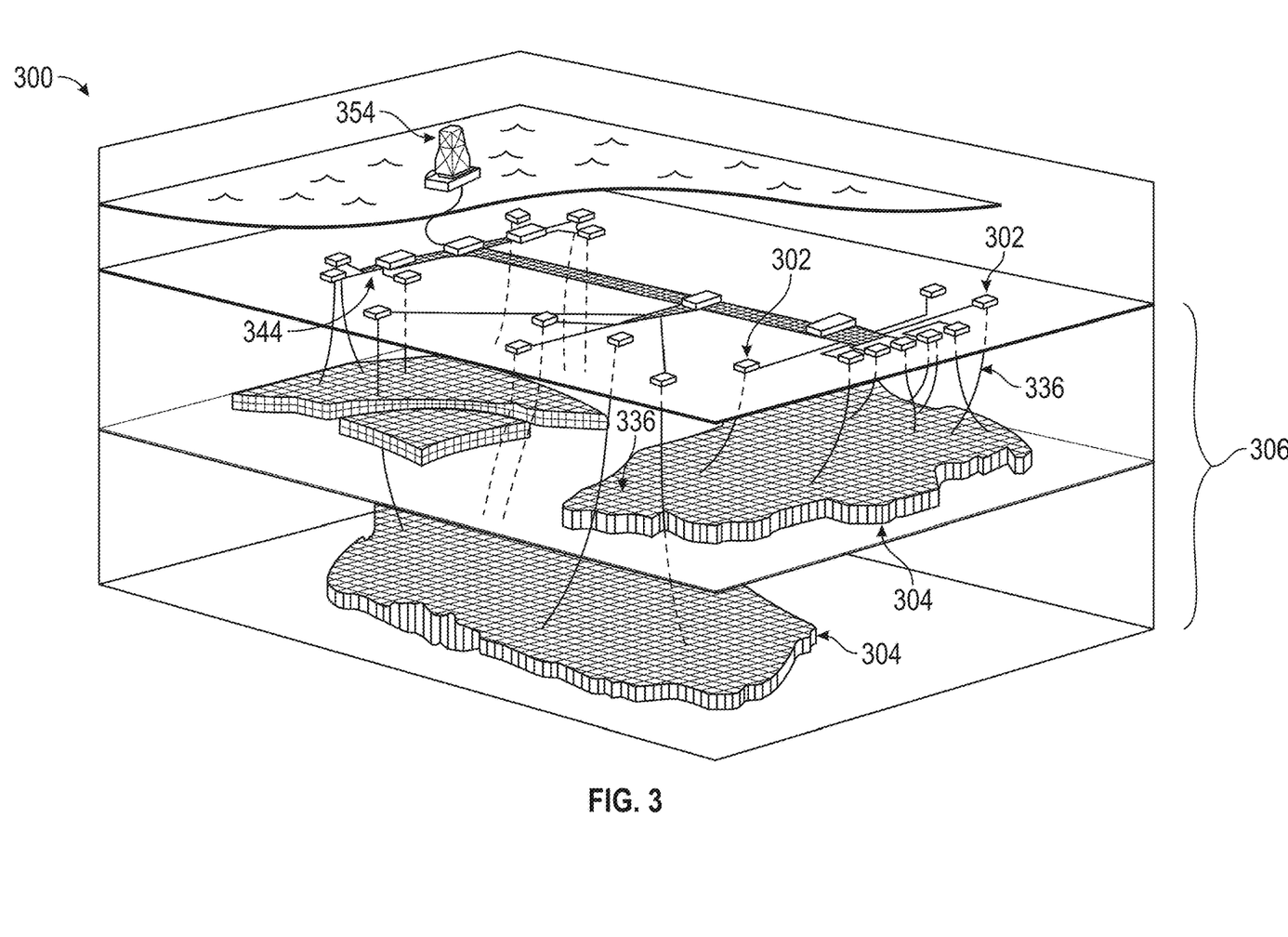
FIG. 3 illustrates a production system for performing one or more oilfield operations in accordance with one or more embodiments.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Hardware and Software Environment

Figure 4:
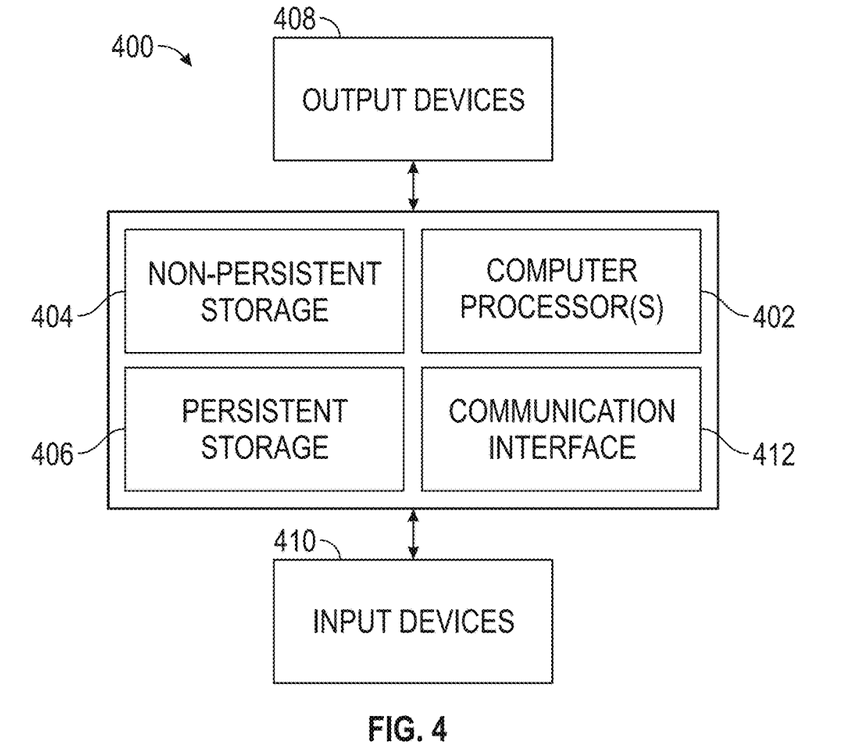
FIG. 4 illustrates an example computing system that can implement the various functions and features described herein.

Embodiments may be implemented on a computing system. Any combination of mobile, desktop, server, router, switch, embedded device, or other types of hardware may be used. For example, as shown in FIG. 4, the computing system 400 may include one or more computer processors 402, non-persistent storage 404 (e.g., volatile memory, such as random access memory (RAM), cache memory), persistent storage 406 (e.g., a hard disk, an optical drive such as a compact disk (CD) drive or digital versatile disk (DVD) drive, a flash memory, etc.), a communication interface 412 (e.g., Bluetooth interface, infrared interface, network interface, optical interface, etc.), and numerous other elements and functionalities.

The computer processor(s) 402 may be an integrated circuit for processing instructions. For example, the computer processor(s) may be one or more cores or micro-cores of a processor. The computing system 400 may also include one or more input devices 410, such as a touchscreen, keyboard, mouse, microphone, touchpad, electronic pen, or any other type of input device.

The communication interface 412 may include an integrated circuit for connecting the computing system 400 to a network (not shown) (e.g., a local area network (LAN), a wide area network (WAN) such as the Internet, mobile network, or any other type of network) and/or to another device, such as another computing device.

Further, the computing system 400 may include one or more output devices 408, such as a screen (e.g., a liquid crystal display (LCD), a plasma display, touchscreen, cathode ray tube (CRT) monitor, projector, augmented reality, virtual reality, or other display device), a printer, external storage, or any other output device. One or more of the output devices may be the same or different from the input device(s). The input and output device(s) may be locally or remotely connected to the computer processor(s) 402, non-persistent storage 404, and persistent storage 406. Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 5:
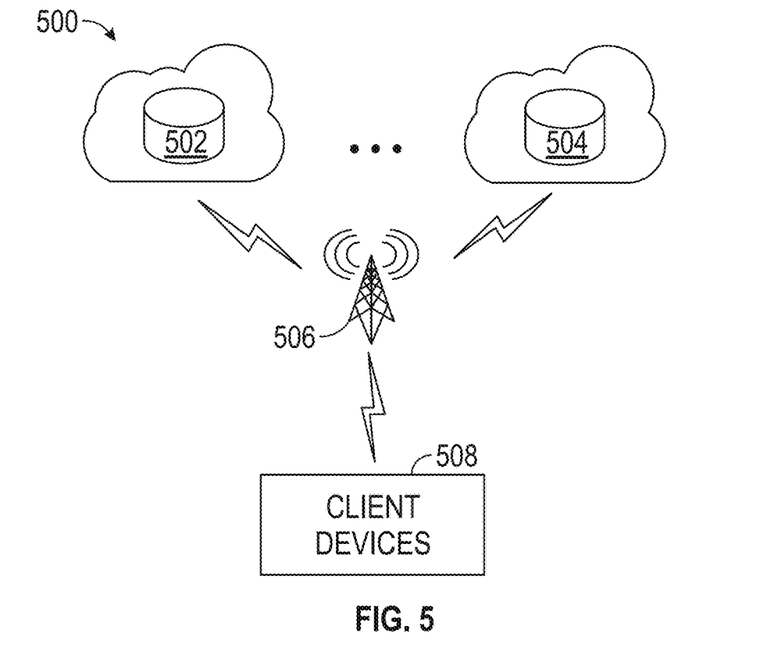
FIG. 5 illustrates an example network that can implement the various functions and features described herein.

The computing system 400 in FIG. 4 may be connected to or be a part of a network, such as the network 506 described by system 500 of FIG. 5. For example, as shown in FIG. 5, the network 506 may include multiple nodes (e.g., node X 502, node Y 504). Each node may correspond to a computing system, such as the computing system shown in FIG. 4, or a group of nodes combined may correspond to the computing system shown in FIG. 4. By way of an example, embodiments may be implemented on a node of a distributed system that is connected to other nodes. By way of another example, embodiments may be implemented on a distributed computing system having multiple nodes, where each portion of the embodiment may be located on a different node within the distributed computing system. Further, one or more elements of the aforementioned computing system 400 may be located at a remote location and connected to the other elements over a network.

Although not shown in FIG. 5, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 502, node Y 504) in the network 506 may be configured to provide services for a client device 508. For example, the nodes may be part of a cloud computing system. The nodes may include functionality to receive requests from the client device 508 and transmit responses to the client device 508. The client device 508 may be a computing system, such as the computing system shown in FIG. 4. Further, the client device 508 may include and/or perform all or a portion of one or more embodiments.

The computing system or group of computing systems described in FIGS. 4 and 5 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions present only a few examples of functions performed by the computing system of FIG. 4 and the nodes and/or client device in FIG. 5. Other functions may be performed using one or more embodiments.

Those skilled in the art will recognize that the example environment illustrated in FIGS. 4 and 5 is not intended to limit the invention. Indeed, those skilled in the art will recognize that other alternative hardware and/or software environments may be used without departing from the scope of the invention.

Data Interpretation Quality Control Using Data Stacking

Data interpretation within the context of the oil and gas industry generally refers to the analysis of data to generate reasonable models and predictions about the properties and structures of a subsurface formation. A number of software tools have been developed to facilitate interpretation, e.g., by displaying graphs, charts or other visualizations of data, by providing interactive manipulation of such visualizations through a graphical user interface, and by providing analytical tools for automating interpretations. Further, the introduction of machine learning has greatly facilitated interpretation of data collected from subsurface formations, enabling geoscientists to produce large quantities of interpretations relatively quickly.

One type of data interpretation, as an example, includes the annotation of well logs and other data collected from wellbores to identify various structures in a subsurface formation, e.g., layer boundaries, faults, and the like. Well logs may be collected using different types of tools that collect different types of data, e.g., gamma ray logging, nuclear magnetic resonance (NMR) logging, sonic logging, resistivity logging, and multiple logs may be collected from multiple wellbores located within a region and intersecting the same layer boundaries and faults. In some instances, the annotation performed in interpretation may include the placement of markers that identify different boundaries and zones within a subsurface formation.

Quality control is desirable to ensure that markers and other annotations made in data interpretations (whether made manually by a geoscientist or automatically via analytical tools) are accurate. Moreover, given the ease in which data interpretations may be made, such quality control is also desirably quick and efficient to minimize the burden on geoscientists to identify and/or correct misinterpretations. Conventionally, such quality control has been a manual and time-consuming process, in many cases requiring geoscientists to manually locate and repick markers. Moreover, when interpreting large datasets and/or using analytical marker picking methods that create large volumes of data in a short period, such manual quality control techniques can be excessively burdensome and inefficient.

In embodiments consistent with the invention, however, data stacking may be used to facilitate such quality control, e.g., to facilitate comparison of well logs for several wellbores and/or perform interpretation within such a visualization. In some embodiments, for example, log responses for multiple wells in a formation and having a similar geology may be concurrently displayed, and a geoscientist may identify a formation feature by creating a marker using a key log response. Once the marker is created, multiple logs may be stacked based on a selected key log, such as a gamma ray log, with the logs stacked and centered around the created marker pick in a stacked log visualization. If all markers are picked correctly, all of the logs will generally line up in the stacked log visualization; however, if one or more logs are mis-interpreted, then the stacked log visualization will generally indicate the misalignment of such log(s). A geoscientist or other user can thereafter quickly assess the accuracy of the interpretation and select a snapping tool to snap a mis-interpreted marker to a more accurate location. Further, in some instances, as soon as a snap/correction is applied, the markers and logs may be updated and aligned, thereby allowing the user to verify the results for several wells at once. As such, some embodiments consistent with the invention may enable fast and efficient identification of poor quality marker picks as well as a fast and efficient manner of correcting them, thereby improving the user experience and workflow efficiency.

In some embodiments, for example, a number of advantages are realized. Stacking of logs on top of each other, for example, may facilitate quick identification of similarities and miss picks. Markers may be edited quickly and effortlessly, and links to stratigraphic/zone columns may enable visualization of entire wells rapidly, thereby enabling users to more quickly assess their markers and well data and also correct misinterpretations.

Figure 6A:
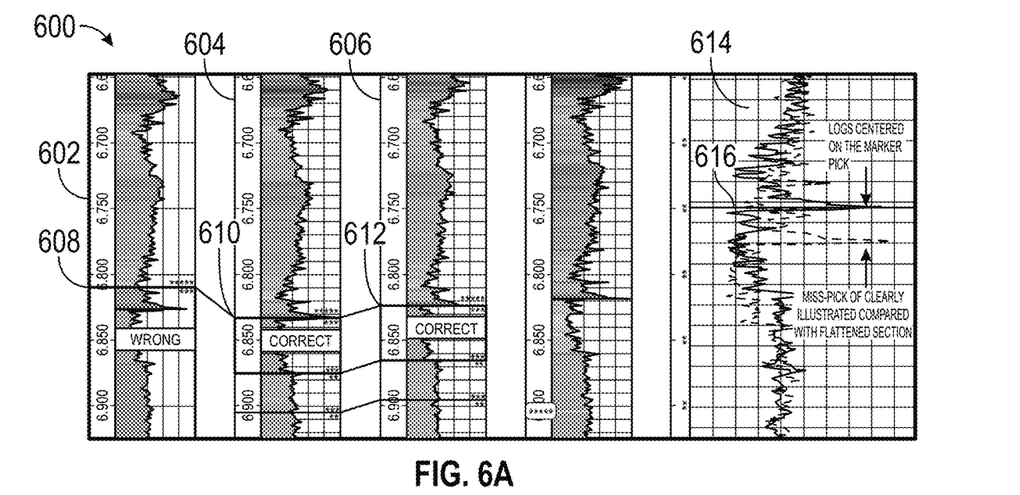
FIGS. 6A-6C illustrate example display representations of interpreted well logs.
Figure 6B:
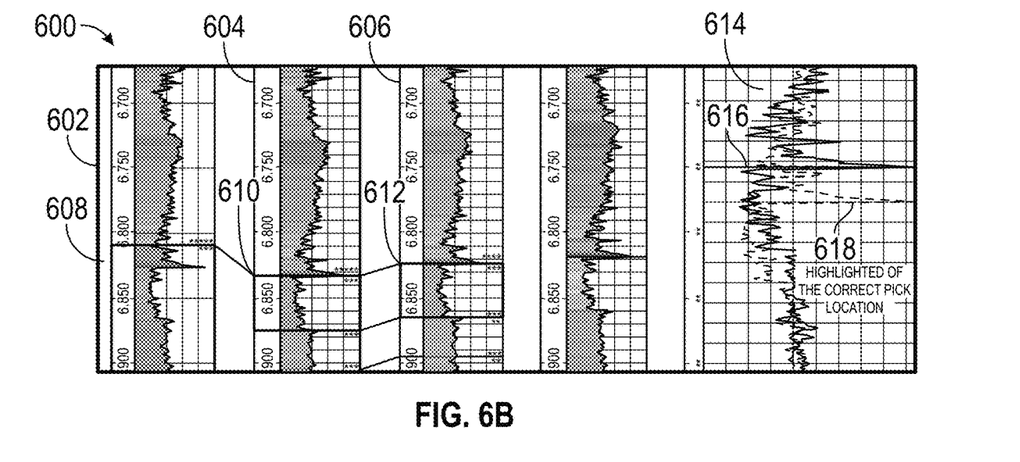
Figure 6C:
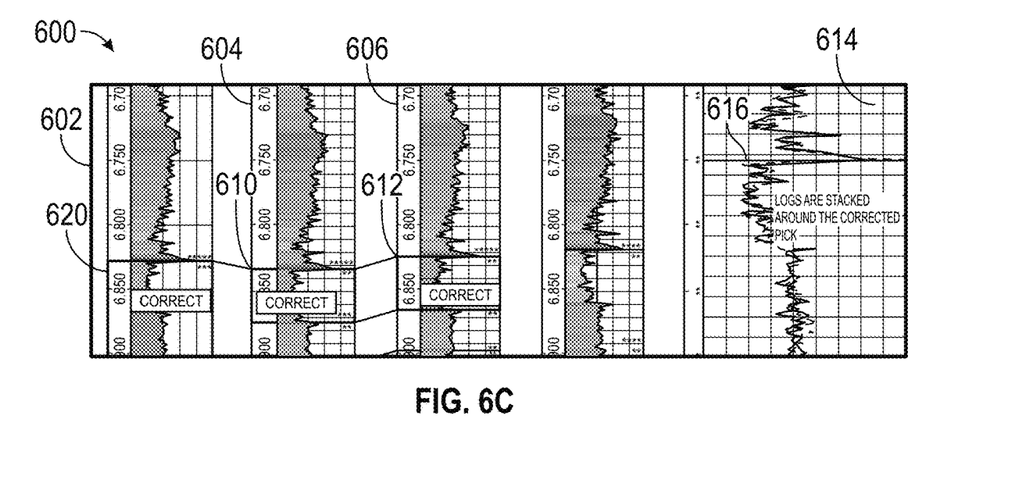

FIGS. 6A-6C, for example, illustrate one implementation of the techniques described herein. FIG. 6A illustrates a visualization 600 of three logs 602, 604, 606 with a marker picked, one of which miss-picked (marker 608 for log 602), and the other two (markers 610, 612 of logs 604, 606) being correct. Adjacent the logs is a data stack visualization 614 that overlays the logs with one another. It may be seen from visualization 614 that the two correct picks overlay the each other around line 616, while the outlier pick is separated from the other two. Moreover, as illustrated in FIG. 6B, it may be desirable to highlight the well log associated with the mis-aligned marker and/or generate a line 618 in visualization 614 to facilitate identification of the mis-aligned marker. This illustrates how the visualization may be used to quickly evaluate the quality of the picks. If the picks are consistent with one another, they generally will overlay the same line, while mis-picks will generally be shifted from center line.

As illustrated in FIG. 6C, a geoscientist or other user may select/click the well log where there is a miss-aligned marker at the location of the correct pick (illustrated at 620), which causes the marker to be snapped to the correct location. In some embodiments, the log may also be slid to the correct location. As further illustrated in this figure, visualization 614 may also be updated at this time, such that the logs all stack with no visible outliers.

In some embodiments, such functionality may also be used to identify incorrect or irrelevant wells, e.g., to facilitate a determination of how relevant a well is or not in order to be further used for propagation (or not).

Figure 7:
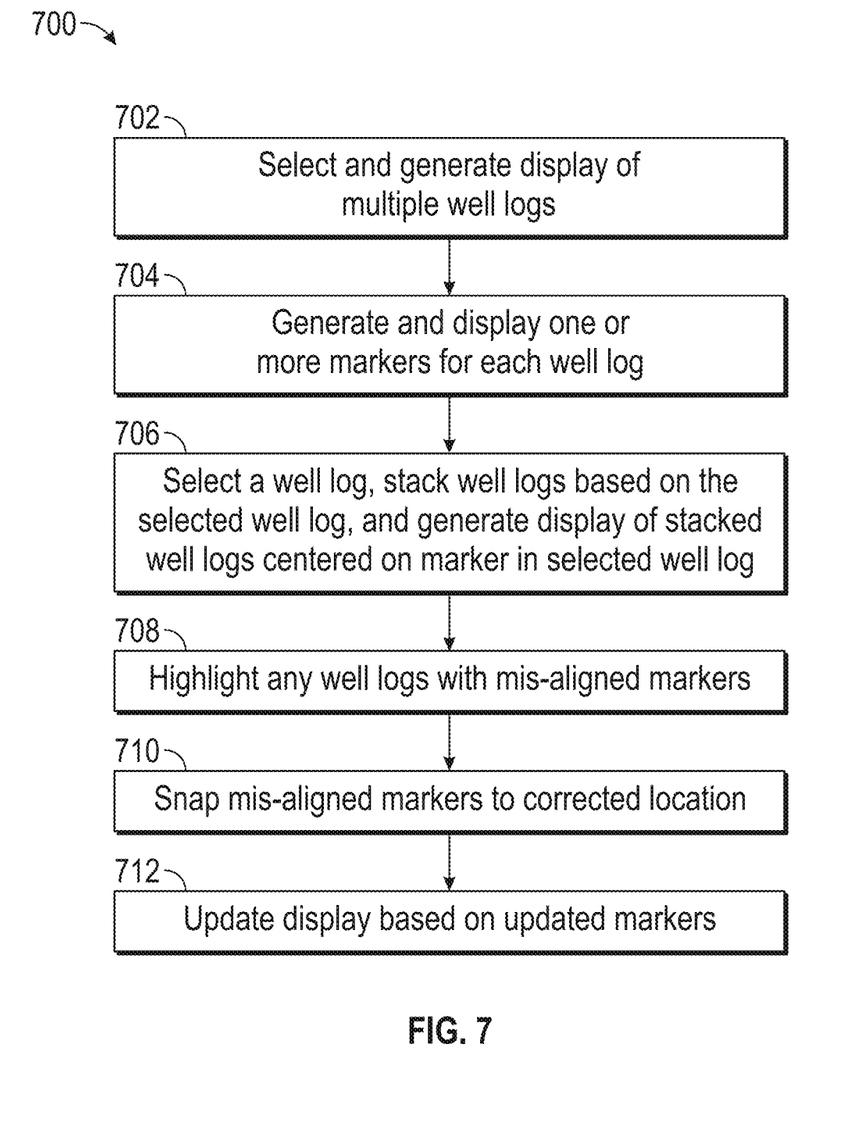
FIG. 7 illustrates an example sequence of operations that can implement the various functions and features described herein.

FIG. 7 illustrates at 700 an example sequence of operations for implementing data stacking consistent with some embodiments of the invention, and implemented, for example, in a computing system such as computing system 400 of FIG. 4. First, in block 702, multiple well logs are selected and displays therefor are generated, e.g., to display each well log side-by-side as illustrated in FIGS. 6A-6C. The well logs may be selected manually or automatically based upon some criterion, e.g., all well logs for wells or wellbores in a particular area or region of a subsurface formation, different types of well logs for the same or similar wells or wellbores, etc. Any number of different types of visualizations used to depict well logs may be used in different embodiments.

Next, in block 704, one or more markers may be generated for each displayed well log, e.g., manually in response to user input and/or automatically based upon analytic techniques. The generated markers may also be displayed on the well logs using various types of visualizations. It will be appreciated that in block 704, each displayed well log will have at least one marker that corresponds to a marker in each other well log, such that the common markers presumably correspond to the same feature (e.g., a layer boundary) in a subsurface formation.

As such, in block 706, one of the well logs may be selected as a key well log, e.g., a gamma ray log for one of the wells or wellbores, and all well logs may be stacked on top of one another and centered around the respective created marker picks, with a visualization of the stacked logs displayed (e.g., in the form illustrated in FIGS. 6A-6C). As noted above, if all markers are accurate, the logs in the stack will generally line up; however, if any marker is inaccurate or mis-placed, the well log associated with that marker will be mis-aligned and be visually identifiable in the stacked log visualization. As such, in some embodiments it may be desirable in block 708 to highlight any well logs with mis-aligned markers.

Next, in block 710, any mis-aligned markers may be snapped to corrected locations. The snapping may be performed automatically in some embodiments, or in response to user input. In some embodiments, for example, a user may click or select a well log with a mis-aligned marker, and have the location of the marker updated to a location that minimizes, reduces or eliminates any misalignment in the log stack. In other embodiments, a user may click, select, drag or otherwise move the marker itself to the desired location. Then, in block 712 the display is updated, e.g., to update the well logs, the marker locations and the log stack, thereby verifying the accuracy of the updated marker position.

It will be appreciated that the operations in sequence 700 may be repeated multiple times in some embodiments, e.g., to correct multiple markers on different well logs. Through the interactive nature of the process therefore, a user may interpret large volumes of log data and correct mis-alignments iteratively with the interpretation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   generating a display representation for a plurality of related data sets associated with a subsurface formation having a formation feature, including generating within the display representation and for each of the plurality of related data sets an associated data set-specific visualization for an individual related data set that further includes an associated marker that is representative of a location of the formation feature in the subsurface formation and that is positioned in the data set-specific visualization of the individual related data set based upon an interpretation performed on the individual related data set;
   generating in the display representation and adjacent to the associated data set-specific visualizations for the plurality of related data sets a data stack visualization that overlays the plurality of related data sets and that positions the plurality of related data sets in the data stack visualization to align the associated markers thereof, wherein generating the data stack visualization shifts at least one of the plurality of related data sets along an axis relative to at least one other related data set among the plurality of related data sets, and wherein generating the data stack visualization includes identifying within the data stack visualization a mis-alignment of a first related data set among the plurality of related data sets such that the associated marker for the first related data set is identified as a mis-interpreted marker;
   causing the display representation to be displayed on a display device;
   after generating the data stack visualization, updating a location of the associated marker of the first related data set to reduce the mis-alignment of the first related data set in the data stack visualization; and updating the data stack visualization and the data set-specific visualization for the first related data set based upon the updated location of the associated marker of the first related data set to reposition the first related data set in the data stack visualization and thereby re-align the associated marker of the first related data set with the associated markers of the other related data sets in the plurality of related data sets.

2. The method of claim 1, wherein updating the location of the associated marker of the first related data set is performed in response to user input.

3. The method of claim 2, wherein the user input selects the first related data set and updating the location of the associated marker of the first related set is performed automatically in response to the user input that selects the first related data set.

4. The method of claim 1, wherein identifying within the data stack visualization the mis-alignment of the first related data set includes highlighting the first related data set in the data stack visualization or generating a line in the data stack visualization that facilitates identification of the mis-interpreted marker.

5. The method of claim 1, further comprising generating the associated marker for each of the plurality of related data sets.

6. The method of claim 5, wherein generating the associated marker for each of the plurality of related data sets is performed by an analytical tool.

7. The method of claim 5, wherein generating the associated marker for each of the plurality of related data sets is performed in response to user input.

8. The method of claim 1, wherein each of the plurality of related data sets includes a well log, and wherein the data stack visualization is a visualization of stacked well logs.

9. The method of claim 8, wherein the well logs for the plurality of related data sets are associated with a plurality of wells or wellbores.

10. The method of claim 8, wherein the well logs for the plurality of related data sets are associated with a plurality of log types.

11. An apparatus, comprising:
one or more processors; and
program code configured upon execution by the one or more processors to:
generate a display representation for a plurality of related data sets associated with a subsurface formation having a formation feature, wherein the program code is configured to generate the display representation by generating within the display representation and for each of the plurality of related data sets an associated data set-specific visualization for an individual related data set that further includes an associated marker that is representative of a location of the formation feature in the subsurface formation and that is positioned in the data set-specific visualization of the individual related data set based upon an interpretation performed on the individual related data set;
generate in the display representation and adjacent to the associated data set-specific visualizations for the plurality of related data sets a data stack visualization that overlays the plurality of related data sets and that positions the plurality of related data sets in the data stack visualization to align the associated markers thereof, wherein generation of the data stack visualization shifts at least one of the plurality of related data sets along an axis relative to at least one other related data set among the plurality of related data sets, and wherein the program code is further configured to identify within the data stack visualization a mis-alignment of a first related data set among the plurality of related data sets such that the associated marker for the first related data set is identified as a mis-interpreted marker; and cause the display representation to be displayed on a display device;

wherein the program code is further configured to, after generating the data stack visualization, update a location of the associated marker of the first related data set to reduce the mis-alignment of the first related data set in the data stack visualization, and update the data stack visualization and the data set-specific visualization for the first related data set based upon the updated location of the associated marker of the first related data set to reposition the first related data set in the data stack visualization and thereby re-align the associated marker of the first related data set with the associated markers of the other related data sets in the plurality of related data sets.

12. The apparatus of claim 11, wherein the program code is configured to update the location of the associated marker in response to user input.

13. The apparatus of claim 12, wherein the user input selects the first related data set and the program code is configured to update the location of the associated marker of the first related set automatically in response to the user input that selects the first related data set.

14. The apparatus of claim 11, wherein the program code is configured to identify within the data stack visualization the mis-alignment of the first related data set by highlighting the first related data set in the data stack visualization or generating a line in the data stack visualization that facilitates identification of the mis-interpreted marker.

15. The apparatus of claim 11, wherein the program code is further configured to generate the associated marker for each of the plurality of related data sets.

16. The apparatus of claim 15, wherein the program code is configured to generate the associated marker for each of the plurality of related data sets using an analytical tool.

17. The apparatus of claim 15, wherein the program code is configured to generate the associated marker for each of the plurality of related data sets in response to user input.

18. The apparatus of claim 11, wherein each of the plurality of related data sets includes a well log, and wherein the data stack visualization is a visualization of stacked well logs.

19. A program product, comprising:
a non-transitory computer readable medium; and
program code stored on the computer readable medium and configured upon execution by one or more processors to:
generate a display representation for a plurality of related data sets associated with a subsurface formation having a formation feature, wherein the program code is configured to generate the display representation by generating within the display representation and for each of the plurality of related data sets an associated data set-specific visualization for an individual related data set that further includes an associated marker that is representative of a location of the formation feature in the subsurface formation and that is positioned in the data set-specific visualization of the individual related data set based upon an interpretation performed on the individual related data set;

generate in the display representation and adjacent to the associated data set-specific visualizations for the plurality of related data sets a data stack visualization that overlays the plurality of related data sets and that positions the plurality of related data sets in the data stack visualization to align the associated markers thereof, wherein generation of the data stack visualization shifts at least one of the plurality of related data sets along an axis relative to at least one other related data set among the plurality of related data sets, and, wherein the program code is further configured to identify within the data stack visualization a mis-alignment of a first related data set among the plurality of related data sets such that the associated marker for the first related data set is identified as a mis-interpreted marker; and cause the display representation to be displayed on a display device;

wherein the program code is further configured to, after generating the data stack visualization, update a location of the associated marker of the first related data set to reduce the mis-alignment of the first related data set in the data stack visualization, and update the data stack visualization and the data set-specific visualization for the first related data set based upon the updated location of the associated marker of the first related data set to reposition the first related data set in the data stack visualization and thereby re-align the associated marker of the first related data set with the associated markers of the other related data sets in the plurality of related data sets.

* * * * *